United States Patent [19]

Lafond

[11] Patent Number: 5,013,377
[45] Date of Patent: May 7, 1991

[54] APPARATUS FOR LAYING STRIP ON GLASS OR LIKE MATERIAL

[75] Inventor: Luc Lafond, Boisbriand, Canada

[73] Assignee: Tremco, Inc., Beachwood, Ohio

[21] Appl. No.: 409,717

[22] Filed: Sep. 20, 1989

[30] Foreign Application Priority Data

Sep. 23, 1988 [CA] Canada ............................ 578349

[51] Int. Cl.⁵ .................................................. B32B 35/00
[52] U.S. Cl. ..................................... 156/109; 156/391; 156/479; 156/574; 156/579
[58] Field of Search ............... 156/391, 479, 579, 486, 156/107, 109, 523, 574

[56] References Cited

U.S. PATENT DOCUMENTS

| Re. 24,937 | 2/1961 | Lea . | |
|---|---|---|---|
| 2,916,079 | 12/1959 | Schiefer . | |
| 3,037,898 | 6/1962 | Zumofen . | |
| 3,730,815 | 5/1973 | Terzian . | |
| 3,733,237 | 5/1973 | Wolff ............................ | 156/109 X |
| 3,951,727 | 4/1976 | Greenberg . | |
| 4,174,246 | 11/1979 | Ralston . | |
| 4,466,847 | 8/1984 | Held . | |
| 4,600,466 | 7/1986 | Herrmann . | |
| 4,623,421 | 11/1986 | Cardin . | |
| 4,666,539 | 5/1987 | Karzmer . | |
| 4,699,686 | 10/1987 | Franke . | |
| 4,756,789 | 7/1988 | Kolff . | |
| 4,759,810 | 7/1988 | Jackson et al. ................. | 156/391 X |
| 4,769,105 | 9/1988 | Lisec ............................. | 156/107 X |
| 4,849,063 | 7/1989 | McXinnon ..................... | 156/391 |

FOREIGN PATENT DOCUMENTS 1234682  4/1988  Canada .
0293302 11/1988  European Pat. Off. .
8600068  2/1986  Fed. Rep. of Germany .

OTHER PUBLICATIONS

Copending U.S. patent application Ser. No. 07/363,510.
"Notice Technique—Ligne Double Vitrage," *Societe Atlantique de Materials Applicques a la Production*, (Mar. 1987).
"Tous Vitrages Isolants" (Sep. 1986).
"Swiggle Strip for Insulating Glass," Tremco Ltd., (date unknown).
Photographs of Muntin Alignment Table of Product Design & Development of York Pennsylvania.
Photographs of hand-held insulating strip applicator of Quelen of France.

*Primary Examiner*—David A. Simmons
*Attorney, Agent, or Firm*—Willian Brinks Olds Hofer Gilson & Lione

[57] ABSTRACT

The disclosure herein describes an apparatus for laying an adhesive strip along the peripheral edges of a glass sheet positioned on a work table with a view to forming a double-glazed insulated glass panel. The apparatus comprises a handle with a housing mounted at one end thereof and includes therein a series of rollers for positioning and laying the adhesive strip on the glass sheet. A third roller, whose axis is perpendicular to the axis of each of the strip-laying rollers, applies pressure to the strip being laid.

30 Claims, 6 Drawing Sheets

APPARATUS FOR LAYING STRIP ON GLASS OR LIKE MATERIAL

FIELD OF THE INVENTION

The present invention relates to an apparatus for laying an adhesive strip along the peripheral edges of a glass sheet or other member positioned on a work table with a view to forming a double-glazed insulated glass panel.

BACKGROUND OF THE INVENTION

One conventional method of making a double-glazed insulated glass panel consists of manually applying an adhesive strip along the peripheral edges of a glass sheet and then positioning a second glass thereupon to form the panel.

One type of strip used in this assembly is the one known under the trademark "Swiggle Strip", which is an extruded butyl-based material of a thermo-plastic compound which contains a corrugated aluminum spacer and molecular sieve desiccant. The corrugation, which extends in a plane perpendicular to that of the glass sheets, lends strength to the spacer to withstand forces which the glass sheets would receive during fabrication, shipping, glazing and servicing. In comparison with other glass panel units which use spacers, corner keys and desiccant, the application of an extruded butyl-based strip allows a continuous strip to be applied along all the sides of the panels uninterruptedly, including the corners. However, the manual application of a continuous strip to the glass sheet requires considerable ability on the part of the installer, especially at the corners.

OBJECT AND STATEMENT OF THE INVENTION

It is an object of the present invention to provide a tool which will allow for an easy application of the adhesive strip along the peripheral edges of a glass sheet.

In one embodiment of the present invention, there is provided a tool for applying a strip of material to a surface of a glass sheet or other member adjacent to the periphery thereof, wherein the glass sheet is adapted to be supported on a support surface. In this embodiment, the tool comprises means for slidably supporting a base member of the tool on a support surface; guide means for guiding the base member along a peripheral edge of the glass pane or member; a body supported on the base member, and at least one roller means associated with the tool for guiding a strip of material around corners of the glass sheet or other member.

This is achieved in one embodiment by providing an apparatus which comprises, in its broadest aspect, a handle; first support means at one end of the handle, including means for contacting the work table on which a glass sheet is positioned; a housing mounted at the opposite end of the handle; second support means mounted to the housing, including means for contacting the work table; and strip receiving and applying means operatively associated with the housing, including roller means contacting one side of the strip to be laid; roller means contacting the strip along the top edge thereof and applying pressure thereon as it is being laid on the glass sheet; and means adapted to cooperate with the roller means for applying the strip at corners of the glass sheet.

In a preferred form of the invention, adjusting means are provided for varying the roller means for different sizes of strips or varying tolerances between the side of the glass sheet and the strip.

In a particularly preferred form of operation, a pivoted latch member is engaged with the corner of the member when a corner is reached, and acts as a pivot or hinge for movement of the base member around the corner, without removing the tool from the working surface, the strip being bent and applied at the corner. The tool is then used to continue application of the strip along another length of the edge.

To assist in maintaining a positive application pressure, and to facilitate movement around corners, the device most desirably uses means for positioning the strip which has a downward sliding action as well as a forward one. In a particularly preferred arrangement, the means for positioning the strip comprises at least one roller, having an axis extending upward, with a slight inclined and forward position in the direction of the movement of the tool in combination with means for positioning the strip.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
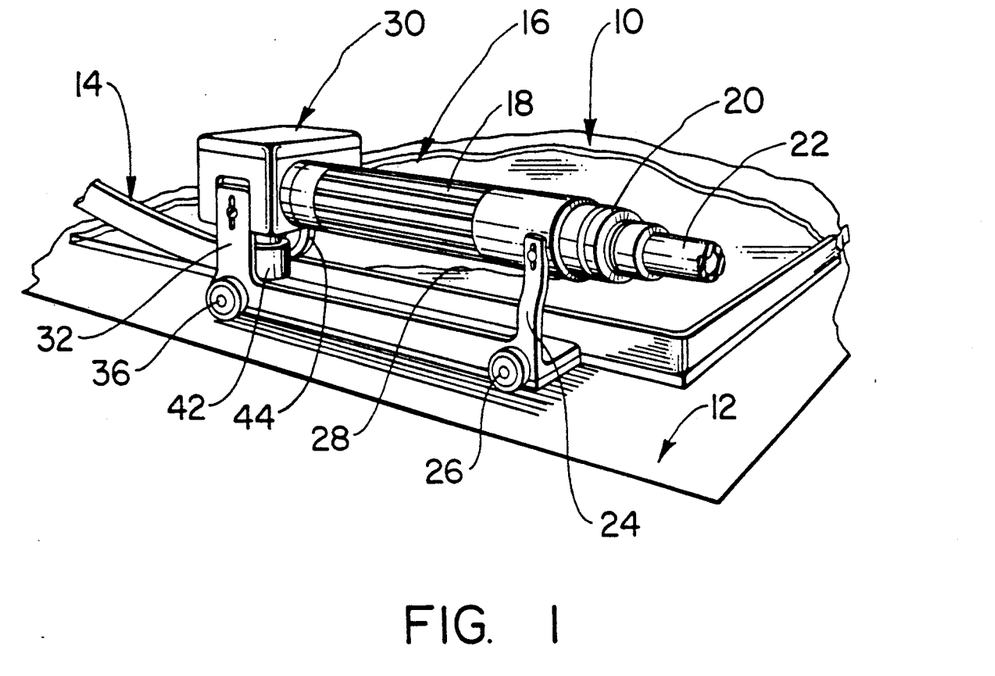
FIG. 1 is a top perspective view showing one embodiment of the apparatus of the present invention during the application of a strip on a glass sheet positioned on a work table.
Figure 2:
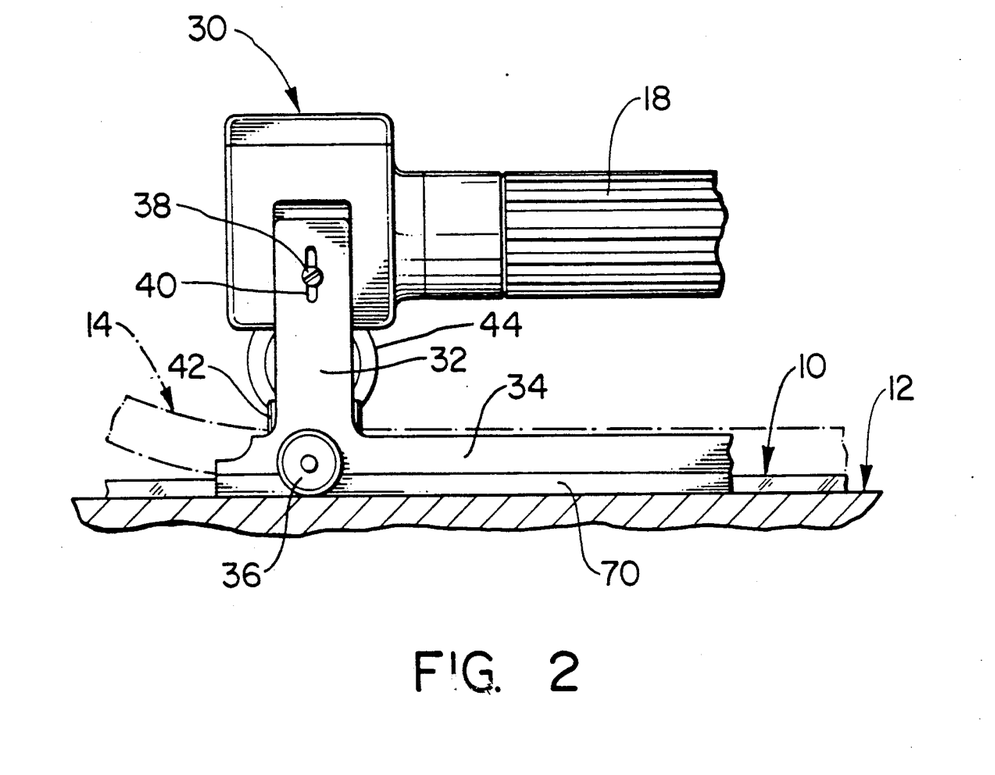
FIG. 2 is a side elevational view of the housing portion of the apparatus and its support means.

Referring to FIGS. 1 and 2, there is shown a glass sheet 10 placed on a work table 12 so that an adhesive strip 14 may be laid along the peripheral edges thereof.

The apparatus of the present invention, generally denoted 16, comprises a horizontally extending handle 18 displaying a cylindrical body having at one end thereof an inlet port 20 for connection to an air supply (not shown) through appropriate conduit 22. This end of the handle 18 is supported by a vertically extending element 24, equipped at the lower end thereof with a roller 26 adapted to roll along the work table 12. A manually operable lever 28 allows access of air from the supply source to a housing 30 mounted to the opposite end of the handle 18.

Housing 30 is supported on the work table 12 by a vertically extending element 32 that has a base portion 34 and a roller 36 for rolling on and thereby contacting the work table 12. Relative positioning of the housing 30 on the element 32 is accomplished by means of a nut 38 adapted to slide in a vertical slot 40.

Figure 3:
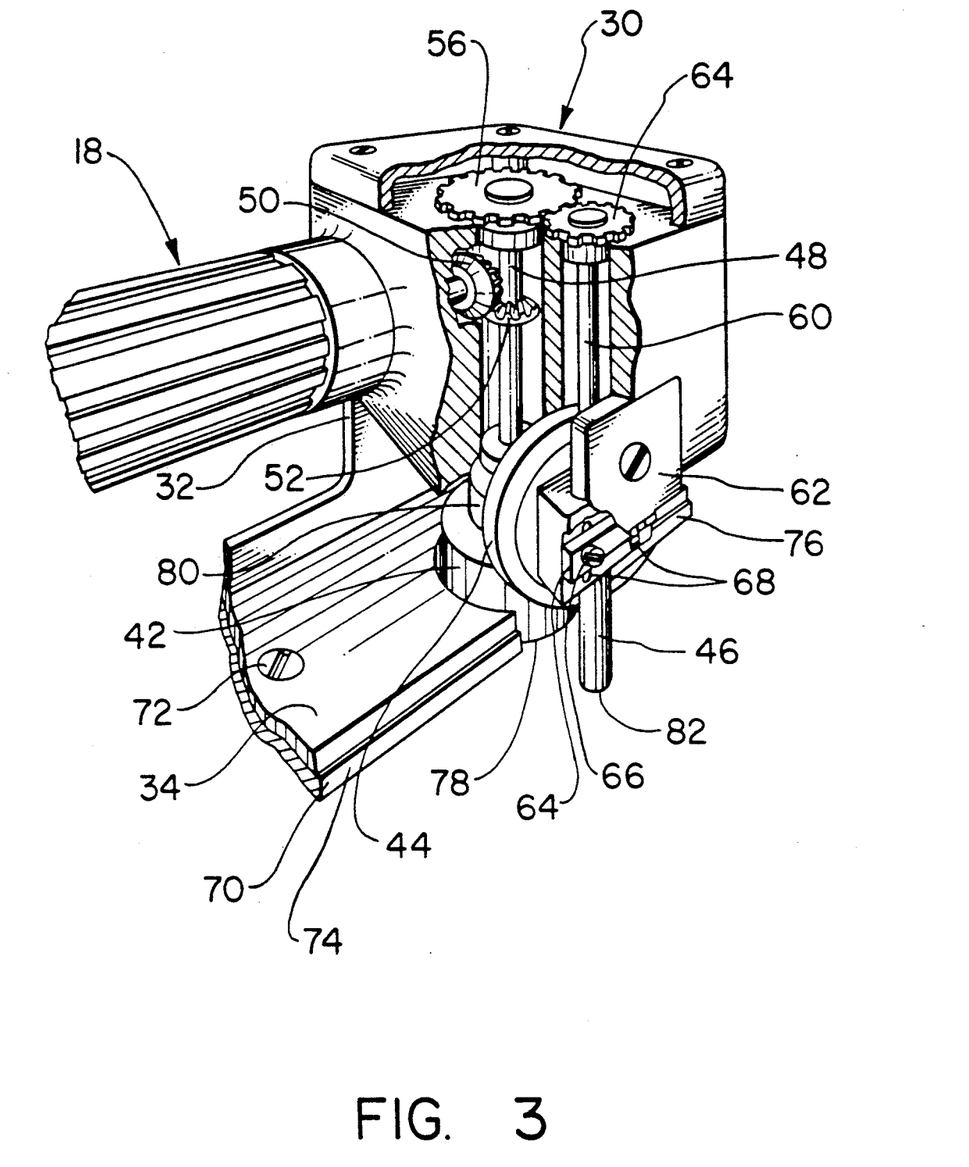
FIG. 3 is a perspective view of the housing, partly sectioned, and shows the various drive mechanisms for operating the rollers mounted to the housing.

Referring more particularly to FIG. 3, three rollers 42, 44, 46 are mounted to housing 30 and together combine for the application of the adhesive 14 along the peripheral edges of the glass sheet 10. Rollers 42 and 46 have parallel vertically extending axes which are rotatably driven by the air supplied through the handle 18 while roller 44, the axis of which extends perpendicular to the axes of rollers 42 and 46, is freely rotatable. Roller 42 is mounted on a shaft 48 which is connected to a drive gear arrangement 50, 52, while roller 46 is driven by means of second gear arrangement 54, 56, receiving torque from shaft 48. Shaft 60 transmits this torque to the roller 46.

The shaft (not shown) of the roller 44 is supported by a side member 62 of the housing 30. The height of roller 44 may be adjusted by means of plate 64 having fastening means 66 slidably mounted in slots 68.

A base plate 70 is secured by means of screws 72 to the base portion 34 of the housing. The base plate 70 has a pair of side faces 74 and 76 which are adapted to contact the side edge of a glass sheet. The base portion 34 as well as the base plate 70 each have a central opening through which extends the roller 42. The bottom wall 78 of the roller 42 extends in a plane which extends slightly above the bottom wall of the base plate 70; the space between the bottom walls corresponds substantially to the thickness of the glass sheet 10 with a small tolerance, so that the bottom wall 78 is slightly above the top face of the glass sheet 10. For various thicknesses of glass, the height of roller 42 is adjusted by means of a chuck collet 80 mounted to the shaft 48. The bottom wall 82 of roller 46 extends in the same plane as that of the bottom wall 78 of roller 42.

Figure 4:
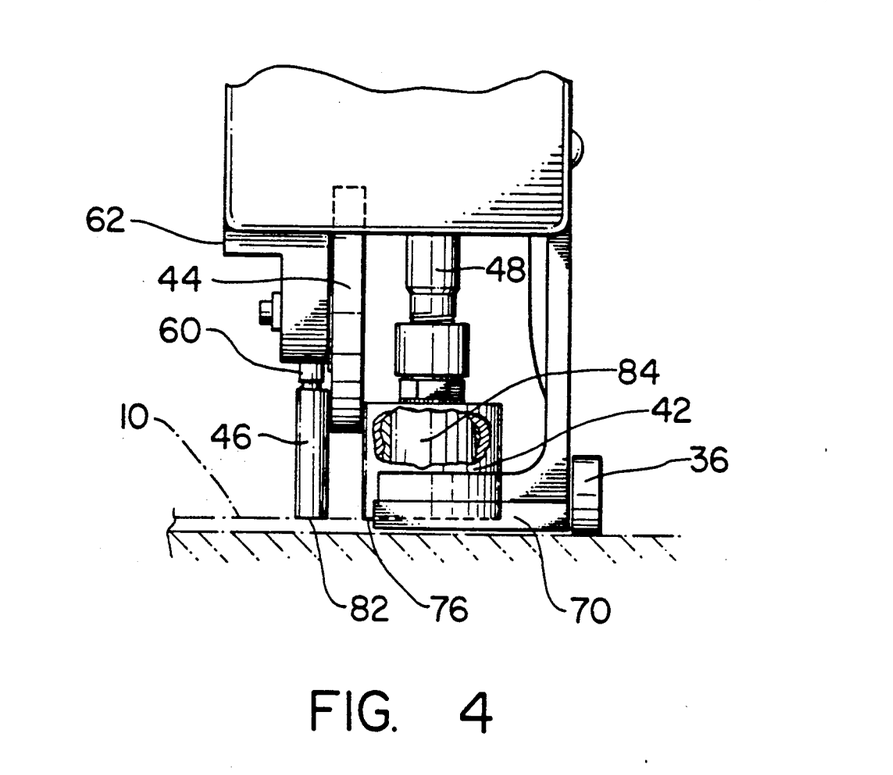
FIG. 4 is a schematic cross-sectional view of the three rollers.

In operation, the strip 14 is applied to the top face of glass sheet 10 by inserting the strip 14 between rollers 42, 44 and 46. Roller 42 is the main drive roller while roller 44 serves to apply a pressure on the strip 14 to secure it to the glass sheet. Roller 46, named the cornering roller, is used principally when, during the application of the adhesive strip 14, a corner of the glass sheet is reached. The main drive roller 42 is rendered idle during the cornering operation. Referring to FIG. 4, the idling is achieved by means of element 84 which blocks rotation of shaft 48.

Figure 5:
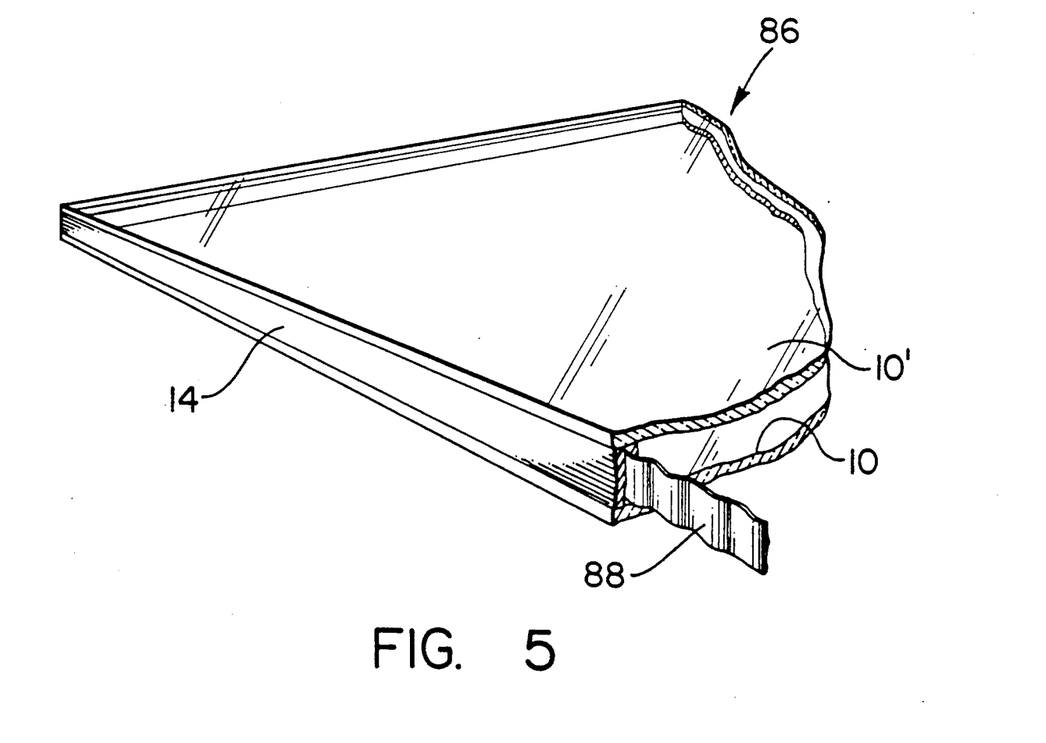
FIG. 5 is a perspective view, with parts broken away, showing a glass panel made in accordance with the present invention.

Referring to FIG. 5, the assembled glass panel 86 is shown consisting of a pair of glass sheets 10 and 10' with the adhesive strip 14 extending between the peripheral edges thereof and securing same together. As indicated above, a preferred adhesive strip is the one known under the trademark "Swiggle Strip", which is formed of an extruded butyl-based strip, and contains a corrugated aluminum spacer 88 to withstand the forces applied perpendicularly to the planes of the glass sheets 10 and 10'.

Preferably, the three rollers 42, 44 and 46 are made of plastic material, while the base plate 70 (including its side faces 74 and 76) is preferably made of nylon.

In the embodiment illustrated in FIGS. 6 to 9, a tool comprises a base member 110 which is supported from a support surface by rollers 111. Mounted on the base member 110 by supports 112 and 113 is a body 114 adapted to be gripped by the hand of an operator.

At the forward end of the body is a housing 115 and extending from the bottom of the housing, being rotatably supported therein, are two rollers 116 and 117, the rollers 116 and 117 rotating about axes which are generally vertical, although, as described later, some departure from the vertical can be provided. Rollers 116 and 117 are spaced apart laterally, in a direction normal to the length of the base member 110, to define an area where a strip of material travels. Positioned between the rollers 116 and 117 is a further, thin roller 118, rotatably mounted in the housing 115 for rotation about a generally horizontal axis extending transversely.

Mounted on the bottom surface of the base member 110 are rollers 120. These rollers rotate about vertical axes and position the tool relative to the edge of the article onto which the strip is to be applied, for example, a sheet of glass 125. This can be seen in FIG. 9a, in which a sheet of glass 125 is shown, supported on a support member 126. The rollers 120 position the tool, and thus, the rollers 116 and 117, relative to the edge 127 of the glass or other member 125. If desired, the rollers 120 can be positioned so that a strip is positioned on the member 125 with its outer surface aligned with the edge 127, or preferably positioned a small distance inward or outward from the edge 127. It will be understood that the strip may be applied so as to overlie the edge where it is desired to use the strip in conjunction with a further component or device for sealing the edge of a window. Alternatively, the position of the rollers 116 and 117 relative to the rollers 120 can be determined so as to position the strip as desired relative to the edge 127.

Rollers 116 and 117 are usually positioned apart very slightly more than the width of a strip, and they may be positioned less than the thickness of the strip to provide a compression force to the strip. The roller 118 is positioned from the top surface 130 of the member 125 such that it presses down slightly on the strip to ensure adhesion to the member 125. A strip is shown in dotted outline at 131 in FIG. 9a.

Figure 9:
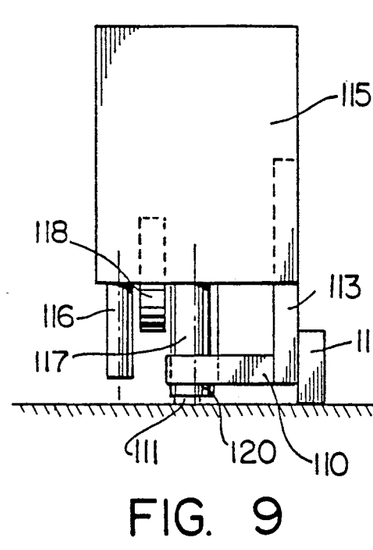
FIG. 9 is an end view in the direction of arrow B in FIG. 6.
Figure 9A:
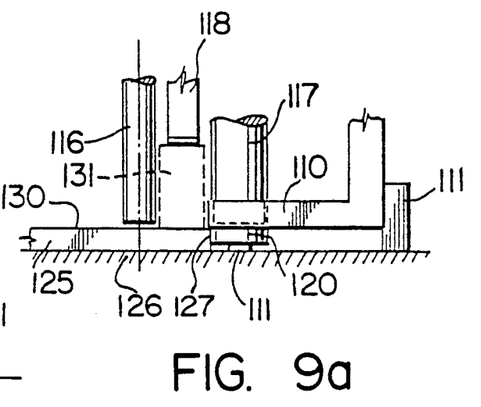
FIG. 9a illustrates the positioning of the tool relative to an article.

The strip is initially positioned with its end on the glass pane or other member 125. The front of the tool is applied to the edge 127 of the glass 125 and moved along the edge 127 of the member 125, the rollers 116 and 117 engaging over the end of the strip, and then continuing to guide the strip relative to the edge 127, a roller 118 pressing the strip into firm contact therewith.

Figure 10:
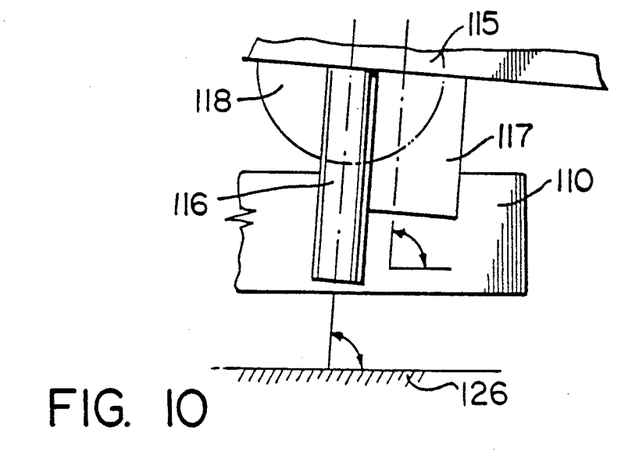
FIG. 10 is a partial view, similar to that of FIG. 6, illustrating a modification.

It is an advantage to have the rollers 116 and 117 inclined at a very small angle, as viewed from the side. This is illustrated in FIG. 10. In FIG. 10, the front end of the tool would be to the right, so that the rollers 116 and 117 have a forward and inclined position. This assists in pushing the strip down into contact with the surface of the article. This inclination is conveniently obtained by inclining the body 114, as indicated in dotted outline in FIG. 6. This also helps to overcome any tendency of the tool to lift at the front.

At the corners of a rectangular or other polygonal shape, it is necessary to bend the strip. Previously, this has been done by hand, usually by lifting the tool up and bending and pressing down the strip, followed by repositioning of the tool, the next length of edge then being traversed.

Figure 11:
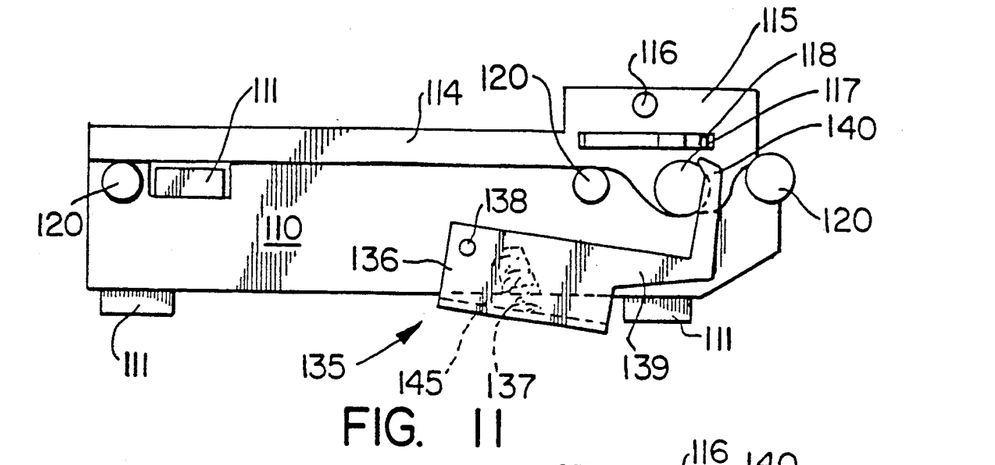
FIG. 11 is a bottom view, similar to that of FIG. 8, illustrating addition of a corner location member, in withdrawn position.

In the present arrangement, a member which locates the tool relative to a corner is provided. This is illustrated particularly in FIGS. 11 and 12, and also in FIG. 13. In FIG. 11, a corner location member 135 is shown in its withdrawn or normal position. The member 135 comprises two flanges 136 and 137 at right angles, the member being pivotally mounted at 138, on the base member 110, at a rear inner corner of the flange 136 but this may be varied as desired.

Figure 12:
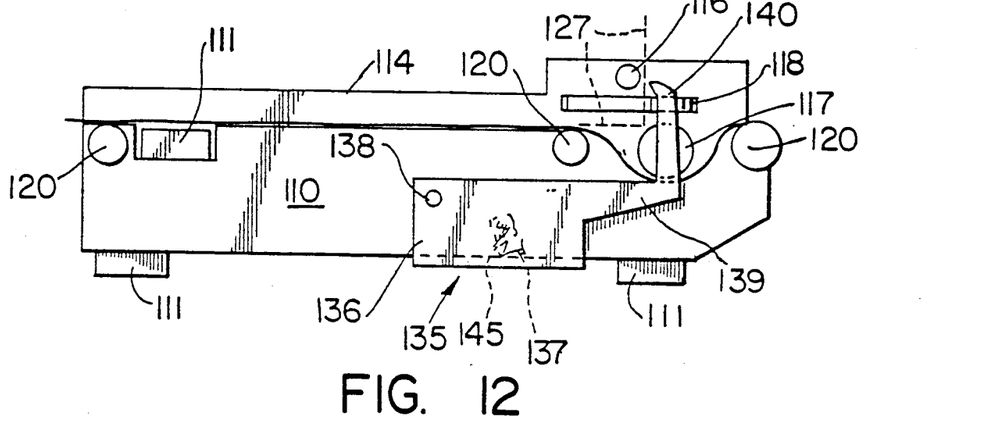
FIG. 12 is a view similar to FIG. 11, with the corner location member in an engaging position.
Figure 13:
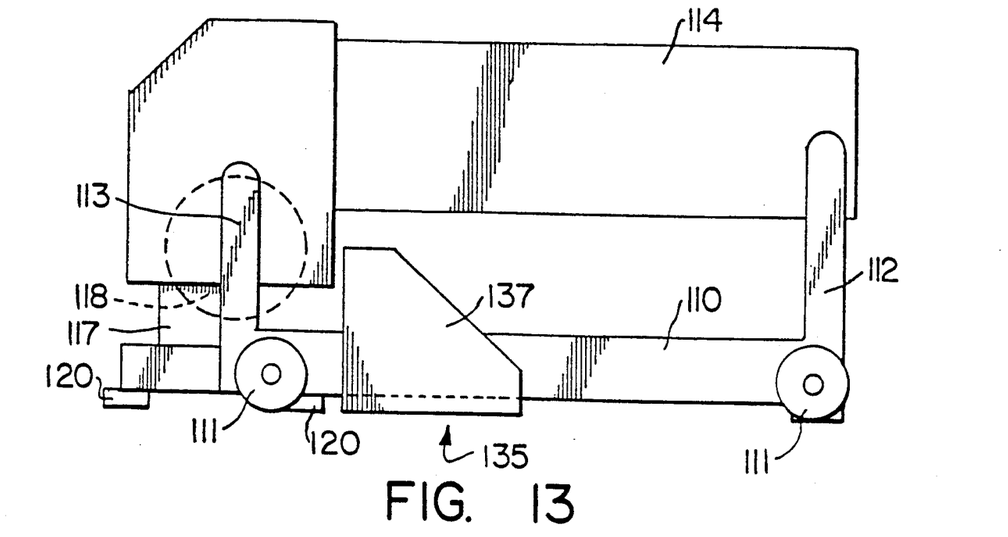
FIG. 13 is a side view, similar to that of FIG. 7, showing the corner location member.

The member 135 is biased to the withdrawn position by a spring 145. At the front edge of flange 136, there extends an arm 139 which extends first forwardly, and then sideways, finishing in a hooked formation 140. Normally the member 135 and its flange 137 are as shown in FIG. 11, with the hooked formation 140 withdrawn out of contact with the glass or other member 125. On approaching a corner, the member 137 (FIG 13) is pushed so that the member 135 moves forward, thereby engaging the hooked formation 140 with the edge 127 of the glass or other member 125, as illustrated in FIG. 12. Once the tool reaches the corner, the hooked formation 140 passes the corner, extending outwardly, and the hooked formation 140 is then out of contact with the edge 127 of the glass 125. The tool is then pivoted around the corner, the roller 116 acting as a pivot point and being held in a band of the strip. The hooked formation 140 and the front roller 120, which have initially passed the corner and are out of contact with the edge 127 of the glass 125, are moved around into subsequent contact with the next edge 127 of the glass 125. The flange 137 is then released, allowing member 135 and hooked formation 140 to retract. The next two rollers 120 move out of contact with the glass edge 127 to which the strip has been applied, and become aligned with the next edge, moving into contact with the next edge of the glass 125. A slight backward movement of the tool causes the hooked formation 140 to engage with the glass 125, as shown in FIG. 12. Pressure is then briefly exerted on the body 114 of the tool in order to ensure that the strip is firmly applied at the corner of the glass or other member 125. The strip is pulled lightly, preferably at an angle relative to the next edge 127 of the glass 125, then generally aligned with the next edge 127. Once the tool has been thus positioned relative to the corner, the glass 125 is moved around to bring the next edge length to the front so that the tool may subsequently progress along the next edge 127.

While the tool has been described as being used for polygonal shaped panes, or other members, it can also be used to apply strip to curved edges or peripheries. For effective positioning of the strip, it would be useful to stretch the strip slightly as it is applied. If the strip is not stretched, the outer surface will be under tension as it will take a longer path than the inner surface, and gradually this will cause the strip to move inwards slightly. This can be overcome by an initial stretching, as by providing a suitably inclined roller.

It will also be appreciated that the edge 127 of the pane of glass or other member 125 need not be at right angles to the surface of the member. If, for any reason, the glass edge 127 is bevelled, then the rollers 120 may, if desired, have a peripheral profile to match. The tool is also equally applicable to members 125 having rounded edges 127.

If desired, a power drive can be provided for one or more of the rollers 111, rollers 120, or a combination thereof. Power drive can also be applied to the rollers 116, 117 and 118.

While the invention has been described in relation to the applying of a strip to flat members, that is, flat sheets or panes of glass, the invention is also applicable to the application of a strip to other forms. The strip itself can have different shapes.

Figure 6:
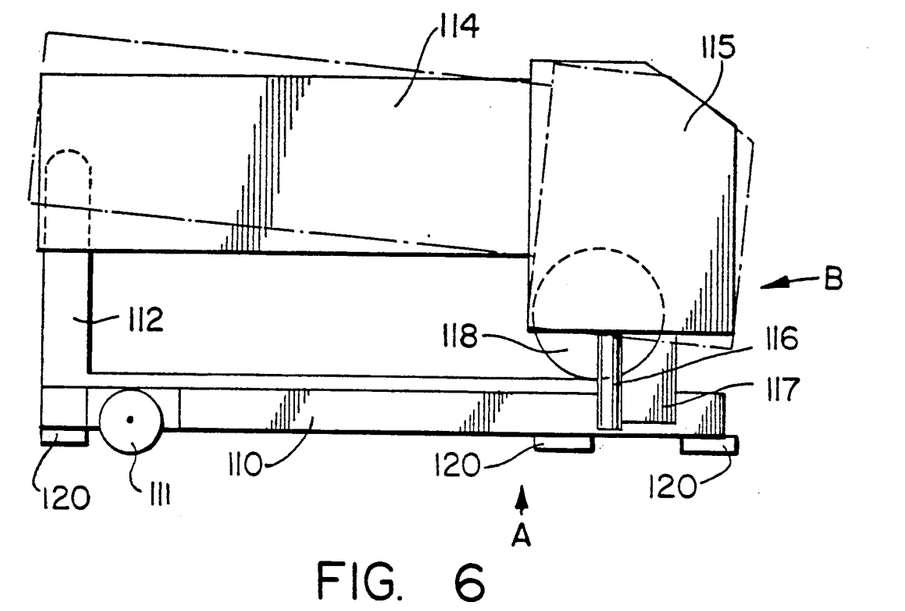
FIG. 6 is a side view of a tool in accordance with another embodiment of the present invention.
Figure 7:
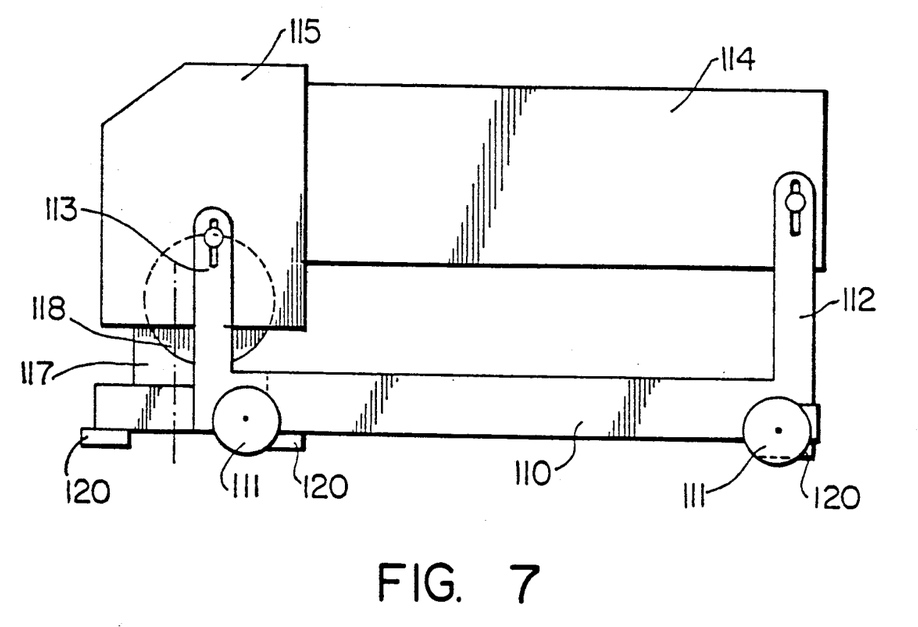
FIG. 7 is a side view of the other side of the tool in FIG. 6.
Figure 8:
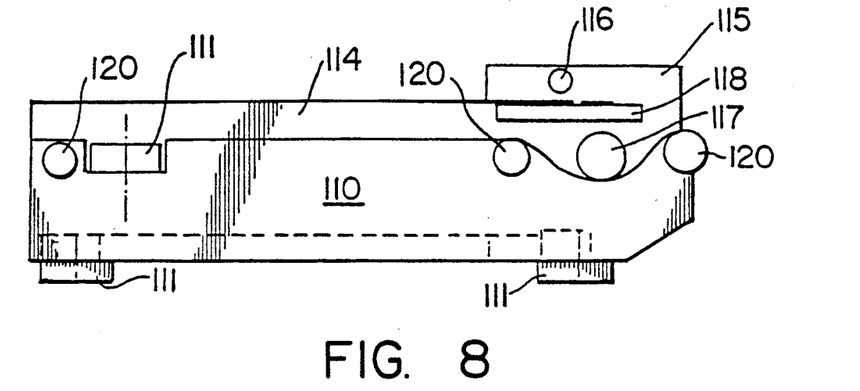
FIG. 8 is a bottom plan view in the direction of arrow A in FIG. 6.

For example, with domed skylights and the like, there is usually a flat peripheral edge and a tool as described above can readily apply a strip at the peripheral edge of such a member. Strip can also be applied to surfaces which are inclined relative to the support surfaces. Preferably the strip would be formed with a contact surface which is inclined to match the inclination of the surface to which it is to be applied. The relative length of the rollers 116 and 117 would be different, and roller 117 may have to be of a smaller diameter.

Although the invention has been described above in relation to specific forms, it should be evident to the persons skilled in the art that it may be modified and defined in various ways. It is therefore wished to have it understood that the present invention should not be limited in interpretation, except by the terms of the following claims.

I claim:

1. Apparatus for laying an adhesive strip along the peripheral edges of a glass sheet or other member resting on a work table, comprising:
   a handle;
   first support means at one end of said handle including means for contacting said work table;
   a housing mounted at the opposite end of said handle;
   a second support means mounted to said housing including means for contacting the work table; and
   strip receiving and applying means operatively associated with said housing and including:
   first roller means contacting said strip on one side thereof;
   pressure roller means contacting said strip along a top edge thereof and applying pressure thereon as it is being laid on the member; and
   further roller means adapted to cooperate with said first roller means and said pressure roller means for applying said strip at said peripheral edges and at corners of said glass sheet.

2. An apparatus as defined in claim 1, further comprising means on said housing for adjusting the height of said pressure roller means for various strip heights.

3. An apparatus as defined in claim 1, further comprising guide means mounted to said second support means of said housing and disposed on either side of said first roller means; said guide means including side surfaces adapted to contact the side edge of said member.

4. An apparatus as defined in claim 3, said guide means are removably mounted to said second support means.

5. An apparatus as defined in claim 3, wherein said second support means includes a base portion having an opening receiving said first roller means therein and wherein said guide means include a base plate secured to said base portion and having an opening therein substantially in registry with the opening of said base portion; said first roller means having a lower face extending in a plane slightly above a plane including a bottom wall of said base plate.

6. An apparatus as defined in claim 5, further comprising means for adjusting the height of said first roller means in said openings for various member thicknesses.

7. An apparatus as defined in claim 1, wherein said first roller means and said further roller means each have a central axis parallel to one another and said pressure roller means have a freely rotating central axis perpendicular to both said parallel axes.

8. An apparatus as defined in claim 1, wherein said first roller means, said pressure roller means and said further roller means are made of plastic material.

9. An apparatus as defined in claim 1, wherein said handle is slightly downwardly inclined from said one end to said housing.

10. A tool for applying a strip of material to a surface of a member, adjacent to the periphery thereof, said member supported on a support surface, the tool comprising: an elongate base member; means for slidably supporting said base member on said support surface; guide means for guiding said base member along a peripheral edge of said member; a body supported on said base member, spaced therefrom for gripping by an operator; a housing at a front end of said body; at least one roller mounted in said housing for rotation about generally vertical axes, said at least one roller being spaced at a distance slightly greater than the width of said strip in a direction normal to the longitudinal axis of said base member; a further roller positioned proximate said at least one roller and mounted for rotation about a generally horizontal axis, extending transversely at said base member, pivoted from a first, withdrawn position to a second, corner-engaging position, said base member pivotable about a corner.

11. A tool as claimed in claim 10, said means for slidably supporting said base member comprising rollers mounted on opposite side edges of said base member.

12. A tool as claimed in claim 11, including one of said rollers on the side edge adjacent to said peripheral edge of said member, and two of said rollers, spaced apart along the side edge remote from said peripheral edge.

13. A tool as claimed in claim 10, said guide means comprising a plurality of rollers mounted on a bottom surface of said base member, for rotation about axes normal to the plane of said base member.

14. A tool as claimed in claim 10, said at least one roller mounted for rotation about an axis inclined upwardly and forwardly, to provide a forward and downward reaction on said strip.

15. A tool as claimed in claim 14, said body inclined forwardly and downwardly corresponding to the inclination of said at least one roller.

16. A tool as claimed in claim 10, including a corner location member pivotally mounted on said base member for engagement with a corner of said member.

17. A tool as claimed in claim 16, said corner location member including an arm for moving beyond said base member for engagement with said base member at said corner, for locating said base member relative to said corner.

18. A hand-held apparatus for laying an adhesive strip on the surface of a glass sheet or other member, said member having a surface and an edge and resting on a work table, comprising:
a frame;
means attached to the frame for directing the adhesive strip onto the surface of the member; and
a guide attached to the frame and configured to guide said directing means a predetermined distance from the edge of the member, said guide maintaining rolling contact with and being supported by the work table.

19. A hand-held apparatus for laying an adhesive strip on the surface of a glass sheet or other member as defined in claim 18, wherein said guide comprises a first roller which maintains rolling contact the work table and a second roller which maintains rolling contact with the member.

20. A hand-held apparatus for laying an adhesive strip on the surface of a glass sheet or other member, said member having a surface and an edge and resting on a work table, comprising:
a frame;
means attached to the frame for directing the adhesive strip onto the surface of the member; and
a guide attached to the frame and configured to guide said directing means a predetermined distance from the edge of the member, said guide maintaining rolling contact with the edge of the member and being supported by the work table.

21. An apparatus for laying an adhesive strip on the surface of a glass sheet or other member, comprising:
a frame;
a handle attached to said frame; and
a first and a second guide roller mounted to said frame between which the adhesive strip may pass when being applied to the member, said guide rollers mounted for rotation about axes inclined forwardly from generally vertical axes whereby the adhesive strip is pushed down into contact with the surface of the member.

22. An apparatus for laying an adhesive strip on the surface of a glass sheet or other member as defined in claim 21, further comprising a pressure roller which contacts the adhesive strip along a top edge thereof and applies pressure thereon as it is being laid on the member.

23. An apparatus for laying an adhesive strip on the surface of a glass sheet or other member, said member having an edge and an interior portion, comprising:
a frame;
a handle attached to said frame;
a guide roller mounted to said frame for rotation about a generally vertical axis;
a cornering roller mounted to said frame such that the adhesive strip may pass between said cornering roller and said guide roller when being applied to the member, said guide roller positioned on the side of the adhesive strip towards the edge of the member and said cornering roller positioned on the side of the adhesive strip towards the interior portion of the member; and means for directing the adhesive strip onto the member.

24. An apparatus for laying an adhesive strip on the surface of a glass sheet or other member as defined in claim 23, wherein said cornering roller has a diameter smaller than the diameter of said guide roller.

25. An apparatus for laying an adhesive strip on the surface of a glass sheet or other member as defined in claim 23, wherein said cornering roller is mounted rearwardly from said guide roller.

26. An apparatus for laying an adhesive strip on the surface of a glass sheet or other member, said member having a corner, comprising:
  a frame;
  means attached to said frame for directing the strip of material onto the surface of the member;
  a guide for positioning said directing means a predetermined distance from the edge of the member; and
  a corner locator attached to said frame, said corner locator capable of movement between a first position and a second position such that said corner locator may be biased against the member to locate the corner of the member.

27. An apparatus for laying an adhesive strip on the surface of a glass sheet or other member as defined as claim 26, wherein said corner locator is pivotally mounted about a pivot point.

28. An apparatus for laying an adhesive strip on the surface of a glass sheet or other member as defined as claim 26, wherein said guide maintains rolling contact with the edge of the member.

29. An apparatus for laying an adhesive strip on the surface of a glass sheet or other member as defined as claim 26, wherein said corner locator is biased against the member.

30. A method for applying a flexible adhesive strip onto the surface of an article resting on a work table, the flexible adhesive strip being applied a predetermined distance from the edge of the article with a tool having a frame, means attached to the frame for directing the adhesive strip onto the surface of the article, a first guide capable of contact with the edge of the article and a second guide capable of contact with the work table, comprising the steps of:
  placing the article on the work table such that the work table extends beyond the edge of the article; and
  applying the flexible adhesive strip to the surface of the article, said applying step comprising the steps of:
    directing the adhesive strip onto the surface of the tool with the directing means; and
    advancing the tool along the edge of the article with the first guide maintaining contact with the edge of the article and with the second roller maintaining contact with the work table.

* * * * *